June 19, 1962 R. E. SCOTT 3,039,160
SOCKETED MOLDING RETAINER
Filed Jan. 23, 1957 2 Sheets-Sheet 1

INVENTOR
ROBERT E. SCOTT
BY Strauch, Nolan & Neale
ATTORNEYS

June 19, 1962  R. E. SCOTT  3,039,160
SOCKETED MOLDING RETAINER
Filed Jan. 23, 1957  2 Sheets-Sheet 2
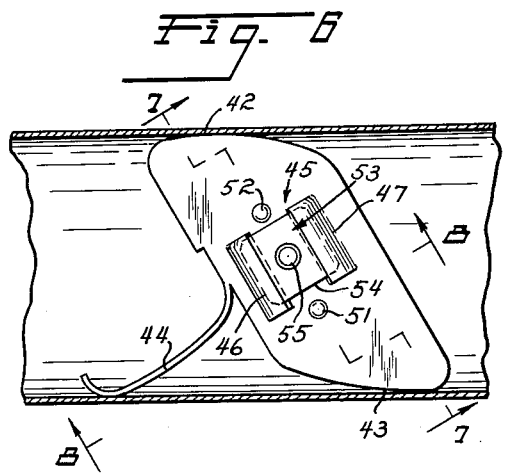
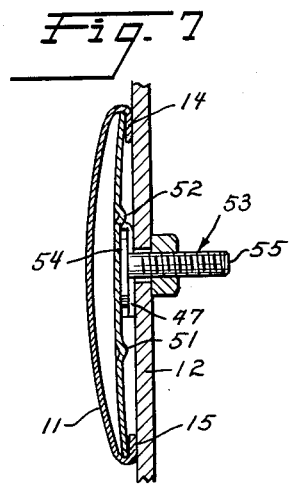
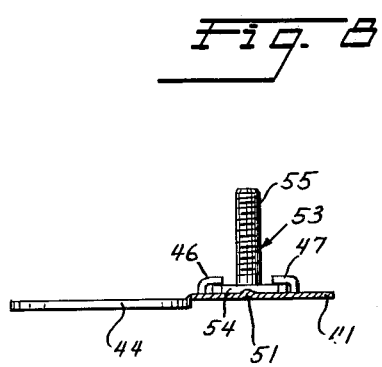
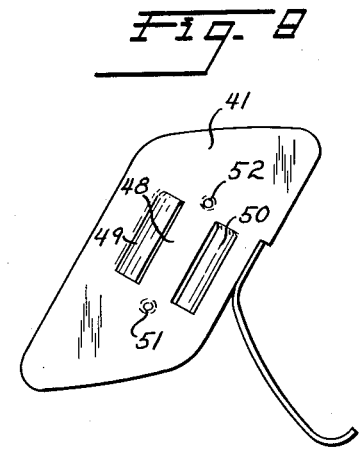
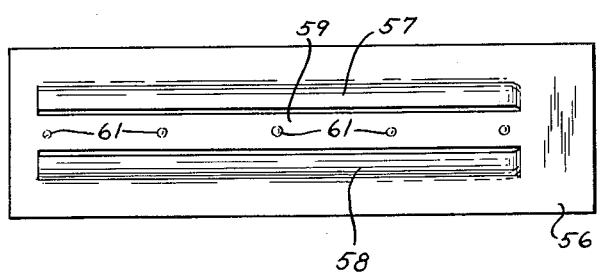
INVENTOR
ROBERT E. SCOTT
BY Strauch, Nolan & Neale
ATTORNEYS

United States Patent Office 3,039,160
Patented June 19, 1962

3,039,160
SOCKETED MOLDING RETAINER
Robert E. Scott, Bloomfield, Mich., assignor to Gagnier Fibre Products Company, Oak Park, Mich., a corporation of Michigan
Filed Jan. 23, 1957, Ser. No. 635,800
6 Claims. (Cl. 24—213)

This invention relates to retainers for attaching molding strips to automobile bodies and like supports and is particularly concerned with devices of this type having a special socket arrangement for incorporation of headed fasteners.

The invention contemplates a device of this nature which is a rigid preferably plate member adapted to engage the molding strip and formed intermediately with a slide socket for speedily receiving and retaining the head of a snap or threaded fastener whose shank is to be thrust into a matching opening in the support.

It is therefore the major object of the invention to provide a novel socketed molding retainer.

A further object of the invention is to provide a relatively stiff molding attachment member having a special socket open at least at one end for slidably receiving the head of a fastener element.

Another object of the invention is to provide a novel molding retainer having on one side a slide socket for laterally receiving and retaining a fastener element.

It is a further object of the invention to provide a novel molding retainer socket for receiving the head of a fastener element wherein the fastener head is retained against undesired removal but permitted a limited free range of self-adjustment travel in the socket.

A further object of the invention is to provide a novel open-ended slide socket in a molding retainer with associated stops for retaining a fastener head in the socket.

A further object of the invention is to provide a novel molding attachment retainer wherein essentially standard fasteners are mounted in special socketed plates.

A further object of the invention is to provide a novel molding retainer assembly wherein a fastener head is slidably mounted in a socket in a rigid plate and means are provided at the socket ends to serve as stops defining a limited self-adjustment travel of the fastener head within the socket but permitting speedy insertion of the fastener head into at least one end of the socket.

Further objects of the invention will appear as the description proceeds in connection with the appended claims and the annexed drawings wherein:

Figure 3:
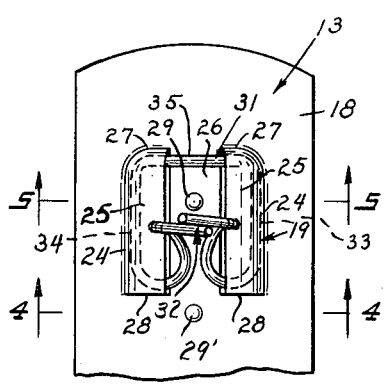
FIGURE 3 is an enlarged rear view of part of the molding retainer showing a snap fastener in the socket.
Figure 4:
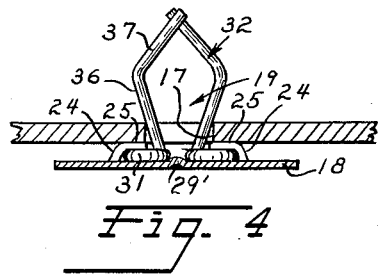
Figure 5:
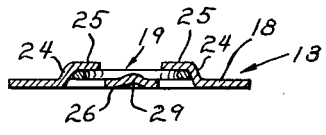

FIGURES 4 and 5 are sections on lines 4—4 and 5—5 of FIGURE 3 showing socket structure details;

FIGURE 6 shows another form of molding retainer socketed to slidably receive the head of a threaded fastener;

FIGURE 7 is a section on line 7—7 of FIGURE 6;

FIGURE 8 is a section on line 8—8 of FIGURE 6;

FIGURE 9 is a view of the socketed retainer from the side opposite that shown in FIGURE 6; and FIGURE 10 shows a long socket for selectively locating one or more fasteners along the retainer length.

Referring to FIGURES 1–6 the strip of molding 11 is secured to support panel 12 by a series of longitudinally spaced retainer assemblies 13.

Molding strip 11 is made of relatively stiff sheet metal and is of the usual type seen extending along the sides of passenger automobiles usually decorative chrome of suitable form. Strip 11 has along the opposed edges of its open side a pair of inturned flanges 14 and 15 adapted to be clamped against panel 12 by retainer 13.

Sheet metal panel 12 is provided with parallel rows of circular apertures 16 and 17 usually punched therethrough with the desired longitudinal and lateral spacing. These rows of apertures are formed by the automobile manufacturer and while they are fairly accurately located, they are not formed with precise tolerances so that the problem of attaching molding must include consideration of slightly misaligned apertures in the panel.

The retainer assembly 13 consists of at least two parts which are assembled together before being mounted on the molding strip. These parts in FIGURES 1–6 are the stiff metal plate 18 and the two similar snap fasteners 19 and 21. For some purposes only one snap fastener is used.

Plate 18 is a quite rigid metal plate preferably slightly bowed in the same direction as the molding to be attached, particularly at its ends 22, 23 which extend into contact with the junctures between flanges 14, 15 and the outer side of the molding. Straight plates 18 substantially parallel to the panel 12 may be used if desired, but the bowed plates provide extra room for socket projections as will appear. Plate 18 may be formed with diagonally disposed bearing ends like those of FIGURE 6 if desired.

Plate 18 is formed with upper and lower slide sockets, each usually by punching metal out of the plane of the plate to form opposed integral side guide channels having substantially parallel sides 24 projecting about the same distance from the same surface of plate 18 and parallel substantially aligned lips 25 extending toward each other. The punching operation leaves a bridge 26 between the plate openings 30 behind the side channels. The channels each have an end wall 27 closing adjacent ends, with their other ends open at 28 to permit slidable insertion of the fastener head. Bridge 26 is formed on the socket side with an upstanding projection 29 which is usually formed of metal displaced out of it as by a sharp punch point, and usually projection 29 is formed in the same operation as the channels.

Figure 1:
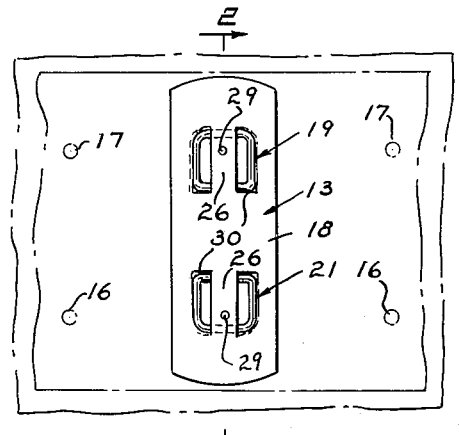
FIGURE 1 is an elevation showing a socketed molding retainer assembly according to an embodiment of the invention.
Figure 2:
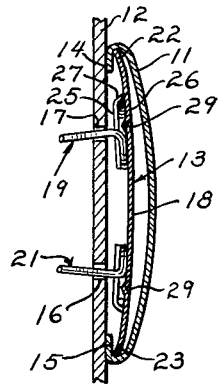
FIGURE 2 is a section on line 2—2 of FIGURE 1 showing the retainer structure and how it clamps the molding strip to the support.

Projection 29 extends only a small distance above the surface of bridge 26 and is usually located near the closed end of the socket for a purpose to appear. As shown in FIGURE 3 another surface projection 29' may be provided just outside and near the open end of the socket. As shown in FIGURES 1 and 2 the open ends of the sockets preferably face each other.

The fasteners 19 and 21 are the same, each comprising a rigid flat head 31 and an expansible and contractible spring stud 32. The fastener here shown is made of a single length of wire intermediately formed to a substantially rectangular frame flat head having parallel sides 33 and 34 connected at one end by side 35 disposed at right angles, and the spring stud is formed by bending the ends of the wire where they meet at the middle of the fourth side of the head inwardly and then downwardly about centrally of the head. These downwardly bent portions are formed with diverging portions 36 and converging portions 37. This fastener is preferably of the type disclosed in Place Patent No. 1,679,266, issued July 31, 1928, but having the head preferably formed in more rectangular outline such as shown in Scott 2,742,671 to slide within the socket channels and be held against turning.

In practicing the invention the plate 18 and the fastener 13 are separately made and then they are assembled by placing the flat head of the fastener on the plate surface with the closed side 35 of the head disposed across the open end of the socket, and then sliding the head 31 into the socket channels to the position of FIGURE 3. It will be observed that the depth of the side channels is about equal to the thickness of the wire of head 31 and as side 35 passes within it cams over projection 29 and continues to move until stopped by the closed end walls of the channels.

With the fastener thus mounted the plate 18 can be picked up and violently shaken without fear of the fastener becoming accidentally detached therefrom, because the head side portion 35 is effectively trapped between projection 29 and the closed channel ends. Where projection 29' is provided it also bars free slidable movement out of the socket beyond a certain amount. On the other hand the plate and fastener can be separated by strongly sliding head 31 toward the open socket end. This arrangement provides a limited loose sliding mount of the fastener on the plate 18 which enables the fastener to adjust itself to properly enter the openings 16 or 17. The fastener head 31 also preferably has some lateral play between the channel side walls 24 sufficient to enable the fastener to adjust itself to compensate for panel aperture misalignments or unequal spacing but this movement is also limited and not enough to enable head 31 to escape its socket.

In practice therefore, as to the FIGURES 1–6 embodiment, the sockets of plate 18 are provided with the loosely slidable fasteners 19 and 21 and a series of plates 18 are slidably inserted into the end of the rather long molding 11 frictionally engaging the molding inwardly of flanges 14 and 15. These plates are displaced to the locations of apertures 16, 17 and the molding is pressed onto panel 12 with the spring shanks of fasteners 19 and 21 entering the respective panel apertures. This type of fastener is self holding because after the fastener shank legs cam in to pass through the panel aperture they spring out until diverging portions 36 engage the edges of the aperture and resiliently pull the fastener and attached plate 18 toward panel 12. This clamps the molding flanges 14 and 15 tight against panel 12.

While two vertically displaced sockets are shown on plate 18, one socket and assembled fastener may be used, as for lighter molding strips. Also while the fastener heads are shown as rectangular they are not necessarily so and may be oval, circular or of a desired contour.

It will be observed that in the assembly the integral bridge 26 extends across and forms a rigid backing for the fastener head so, that no matter how much force is exerted to push the fastener studs through the panel apertures, the fastener heads do not contact or deform the relatively bendable expensive moldings.

Furthermore while the sockets are shown as open at one end and closed at the other, it is within the province of the invention to provide such sockets open at both ends and provide on the surface of plate 18 near the outer channel ends a suitably located stop projection like that at 29' for example to function like the channel end walls in trapping the fastener head within limits within the socket channels.

These detent or detents 29 may be located to project inwardly from the channel walls 25 instead of upwardly from the surface of plate 18 and equivalently function to serve as slide limit stops for the fastener head.

FIGURES 6–9 illustrate an embodiment of the invention using different forms of molding engaging plates and associated fasteners. The rigid metal plate 41 is of the type having on opposite sides arcuate bearing edges 42, 43 adapted to frictionally engage within end flanges 14, 15 of the molding strip. The bearing edges 42, 43 enable the plate to be rotated clockwise in the plane of the drawing to adapt itself to different width molding strips, and integral biasing spring leg 44 which is compressed in the assembly tends to rotate the plate 41 clockwise and maintain it in snug engagement with the molding.

This type of plate so far is generally known, but in the invention it is specially formed with an open ended slide socket 45 consisting of identical opposed channels 46, 47 punched out of the metal of the plate, thus leaving a bridge 48 between openings 49, 50.

Adjacent the opposite open ends of the slide socket the plate metal is displaced to form substantially centrally aligned cam and stop projections 51 and 52 which are like projection 29' of the other embodiment.

The fastener element may comprise a modified rigid bolt 53 having a flat head 54 and a threaded shank 55, and the head may be slidably inserted into either end of the socket. The depth of channels 46, 47 relative to the height of projections 51 or 52, is such that the head 54 frictionally cams over the projection in entering the socket and is then effectively trapped in the socket within a definite range of slidable movement between the projections 51 and 52 that serve as end stops.

FIGURE 10 shows an embodiment of the invention wherein an elongated plate 56 is formed with parallel surface channels 57, 58 open toward each other to serve as a slide socket for receiving the fastener heads. The bridge 59 between the channels is formed with a series of surface projections 61 which function like the surface projections of the other embodiments to enable one or more fasteners to be located along different sections of the slide socket with each fastener trapped in the socket between an adjacent pair of projections permitting a limited range of movement of the fastener along the socket beyond which a definite intentional force is required to push the fastener head over the projection.

The invention contemplates the use of slightly curved slide sockets with correspondingly arcuate fastener heads for sliding into them.

In the invention standard type fasteners, either of the snap or bolt type, may be used. These are inexpensively purchased in quantity and speedily assembled with the special socketed plate to form a molding attachment assembly that has superior application and holding properties. As the molding, with the retainer assemblies in it, is applied to the support the fasteners seek proper alignment with the support holes due to the permitted slide range of the fastener head in the socket, and these heads are held against accidental separation from the socket plate but are easily removable for replacement or substitution of a different fastener.

The invention may be embodied in other specific forms without departing from the spirit or essential characteristics thereof. The present embodiments are therefore to be considered in all respects as illustrative and not restrictive. the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a retainer assembly for attaching a hollow molding having an open side edged by opposed flanges to a support having an aperture, a rigid plate-like member adapted to bridge said molding interiorly of said flanges and be frictionally received within said molding in backing relation to said flanges, means providing a longitudinal slide socket in the surface of said member adapted to face said support, said socket being formed of opposed channels with a bridge between them, each channel having an opening that comprises a portion that is opposite the opening of the opposed channel and comprises an end opening, said end openings being at the same ends of said channels, a fastener having a head structure that is rigid in a plane and shaped to be slidably inserted through said open ends of the socket channels and having a holding shank projecting away from said member to enter said support aperture, and stop means comprising a projection upstanding from the surface of said member at said socket for retaining said fastener head in said socket but permitting a limited relatively free sliding of said head within the socket, said stop projection being rounded to permit said fastener head to be forced thereover during insertion into said socket channels and being located to limit said free sliding of the fastener head along said bridge.

2. A molding attachment assembly comprising a stiff metal plate having molding engaging means at opposite ends, a fastener head receiving socket formed integrally on one side of said plate comprising opposed channels open toward each other and formed from metal displaced out of said plate and a bridge in the plane of said plate extending the length of said socket, said channels being open at least at one pair of adjacent ends and serving as side guides for a fastener head slidably inserted into said socket at said pair of ends, and means rigid with said plate at opposite ends of said socket providing stops for retaining a fastener head in said socket but permitting forcible slidable insertion of said fastener head at at least one end of said socket, one of said stops comprising an integral rounded projection on the channel side of said plate located to limit sliding movement of the fastener head along said bridge.

3. A molding attachment assembly comprising a stiff metal plate having molding engaging means at opposite ends, a fastener head receiving socket formed integrally on one side of said plate comprising opposed channels open toward each other and formed from metal displaced out of said plate and a bridge in the plane of said plate extending the length of said socket, said channels serving as side guides for a fastener head slidably inserted into said socket, and means rigid with said plate at said socket providing stops for retaining a fastener head in said socket but permitting forcible slidable insertion of said fastener head at at least one end of said socket, one of said stops comprising a closed channel end at the other end of said socket and the other of said stops being a surface projection on said plate located to restrict slidable displacement of a fastener head in said socket along said bridge.

4. A molding attachment assembly comprising a stiff metal plate having at opposite end edges arcuate molding bearing surfaces, means providing a fastener head receiving socket comprising opposed parallel channels formed by material displaced out of the plate and facing each other across a bridge disposed in the plane of the plate, a fastener having a rigid head portion disposed in said socket so as to be seated upon said bridge and with opposite sides in said channels, said fastener having a stud projecting at right angles to the plate and away from said bridge, and stop means on the surface of the plate restricting movement of said fastener head out of said socket, one of said stop means comprising a rounded projection over which said fastener head may be forced during insertion into said channels and located to limit slidable displacement of said fastener head along said bridge in the assembly of said plate and fastener.

5. A molding attachment assembly comprising a stiff metal plate having molding engaging means at opposite ends, a fastener head receiving socket formed integrally on one side of said plate comprising opposed channels open toward each other and formed from metal displaced out of said plate and a bridge in the plane of said plate extending the length of said socket, said channels serving as side guides for a fastener head slidably inserted into said socket, and means rigid with said plate at said socket providing stops for retaining a fastener head in said socket but permitting forcible slidable insertion of said fastener head at at least one end of said socket, one of said stops comprising a closed channel end at the other end of said socket and the other of said stops being a surface projection on said plate, said projection being formed on said bridge near the closed channel end.

6. A molding attachment assembly comprising a stiff metal plate having at opposite end edges arcuate molding bearing surfaces, means providing a fastener head receiving socket comprising opposed parallel channels formed by material displaced out of the plate and facing each other across a bridge disposed in the plane of the plate, a tension arm for biasing said bearing surfaces into contact with the molding comprising a spring arm fixed at one end to said head near the socket and having an outer molding bearing portion, a fastener having a rigid head portion disposed in said socket so as to be seated upon said bridge and with opposite sides in said channels, said fastener having a stud projecting at right angles to the plate and away from said bridge, and stop means on the surface of the plate restricting movement of said fastener head out of said socket, one of said stop means comprising a rounded projection over which said fastener head may be forced during insertion into said channels and located to limit slidable displacement of said fastener head along said bridge in the assembly of said plate and fastener.

References Cited in the file of this patent

UNITED STATES PATENTS

| 882,708 | Mund | Mar. 24, 1908 |
| 2,033,448 | Rodack | Mar. 10, 1936 |
| 2,037,301 | Ball | Apr. 14, 1936 |
| 2,176,960 | Fridolph | Oct. 24, 1939 |
| 2,598,776 | Flora | June 3, 1952 |

FOREIGN PATENTS

| 179,750 | Switzerland | Dec. 2, 1935 |
| 618,939 | Great Britain | Mar. 1, 1949 |